US006946049B2

(12) United States Patent
Yamaguchi

(10) Patent No.: US 6,946,049 B2
(45) Date of Patent: Sep. 20, 2005

(54) TISSUE PAPER USED FOR HEAT-SENSITIVE STENCIL SHEET, HEAT-SENSITIVE STENCIL SHEET, AND METHOD OF MAKING THE SAME

(75) Inventor: Hideyuki Yamaguchi, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 150 days.

(21) Appl. No.: 10/358,682

(22) Filed: Feb. 3, 2003

(65) Prior Publication Data

US 2003/0150576 A1 Aug. 14, 2003

Related U.S. Application Data

(62) Division of application No. 10/077,455, filed on Feb. 14, 2002, now Pat. No. 6,866,924.

(30) Foreign Application Priority Data

Feb. 14, 2001 (JP) .................................... P2001-037652
Jan. 31, 2002 (JP) .................................... P2002-024816
Feb. 13, 2002 (JP) .................................... P2002-035712

(51) Int. Cl.$^{7}$ .................................................. B32B 7/14
(52) U.S. Cl. .................... 156/291; 156/272.2; 156/290; 156/275.5; 156/275.7; 156/273.3; 428/198; 428/304.4; 428/195.1; 162/100; 162/231
(58) Field of Search ................................ 156/290, 291, 156/272.2, 275.5, 275.7, 273.3; 428/304.4, 195.1, 198; 162/231, 100

(56) References Cited

U.S. PATENT DOCUMENTS 4,196,033 A * 4/1980 Arai et al. .................. 156/196
4,981,746 A * 1/1991 Matsuo et al. ........... 428/195.1
5,091,257 A 2/1992 Nonogaki et al.
5,270,099 A * 12/1993 Kamiyama et al. ...... 428/195.1
5,707,712 A 1/1998 Fujimura et al.
6,372,332 B1 * 4/2002 Arai et al. ............... 428/304.4

FOREIGN PATENT DOCUMENTS

| | | |
|---|---|---|
| JP | 498809 | 2/1974 |
| JP | 4918728 | 5/1974 |
| JP | 5547997 | 12/1980 |
| JP | 58076597 | 5/1983 |
| JP | 58076598 | 5/1983 |
| JP | 58076598 | 5/1986 |
| JP | 61254396 | 11/1986 |
| JP | WO8901872 | 3/1989 |
| JP | 01154796 | 6/1989 |
| JP | 352354 | 8/1991 |
| JP | 4107623 | 4/1992 |
| JP | 643151 | 6/1994 |
| JP | 11235855 | 8/1999 |

* cited by examiner

*Primary Examiner*—Rena Dye
*Assistant Examiner*—Tamra Dicus
(74) *Attorney, Agent, or Firm*—Cooper & Dunham LLP

(57) ABSTRACT

A tissue paper used for heat sensitive stencil sheet to be used for a heat-sensitive stencil sheet comprising natural fibers, synthetic fibers, or their mixture, which being impregnated with an ionizing radiation curable type of resin, and a heat-sensitive stencil sheet having a thermoplastic resin film being bonded thereto, wherein, at surface of one side of the resin film, there is provided the tissue paper used for heat-sensitive stencil sheet, which is that being bonded the thermoplastic resin film by point-bonding with using an ionizing radiation-curable resin, and there is provided an anti-sticking layer on the other side of the thermoplastic resin film.

12 Claims, 5 Drawing Sheets

TISSUE PAPER USED FOR HEAT-SENSITIVE STENCIL SHEET, HEAT-SENSITIVE STENCIL SHEET, AND METHOD OF MAKING THE SAME

This application is a divisional of U.S. Ser. No. 10/077,455, file Feb. 14, 2000 now U.S. Pat. No. 6,866,924, the entire contents of which are incorporated by reference herein.

BACKGROUND OF THE INVENTION

1. Field of the Invention

The present invention relates to a tissue paper used for heat-sensitive stencil sheet, a heat-sensitive stencil sheet, and a method of fabricating the same. More specifically, the present invention relates to a high quality of heat-sensitive stencil sheet to be perforated with irradiation of infrared light or flash light from a halogen lamp, a xenon lamp, or a flash bulb, pulsed irradiation of laser light, or heat irradiation from a thermal head, and a method of fabricating the same at less cost.

2. Description of the Related Art

There are generally known heat-sensitive stencil sheets, in which tissue papers used are (1) a paper as called Japanese paper which is milled from a natural fiber such as mulberry, mitsumata, or Manila hemp (as disclosed in Japanese Examined Patent Publication of Tokkou Shou 41-7623,(2) a paper milled from a synthetic fiber such as rayon, vinylon, polyester, or nylon, (3) a mixture milled paper of the natural fiber (1) and the synthetic fiber (2) (as disclosed in Japanese Examined Patent Publication of Tokkou Shou 49-18728, and (4) a tissue paper called polyester paper which is made by a polyester fiber or a mixture of it and non-oriented polyester fiber as a fibrous binder, and formed by the use of heat rolls, as disclosed in Japanese Examined Patent Publication of Tokkou Shou 49-8809.

As these tissue papers are deflected in shape or changed in dimensions by moisture or temperature thus declined in their properties, the improvements were proposed that include an effort for minimizing the dimensional change in the humid conditions, as disclosed in Japanese Unexamined Patent Publication of Tokkai Shou 61-254396 and Japanese Examined Patent Publication of Tokkou Shou 06-43151, or a use of a synthetic resin impregnated in tissue to act as an adhesive for bonding between the tissue and a film, as disclosed in Japanese Examined Patent Publication of Tokkou Shou 55-47997. Also, methods of fabricating polyester paper having an improved dimensional stability and the resistance to heat are proposed as disclosed in Japanese Unexamined Patent Publication of Tokkou Shou 58-76597 and Japanese Unexamined Patent Publication of Tokkou Shou 58-76598.

Moreover, proposed are a method of fabricating a heat-sensitive stencil sheet impregnated with a radiation-curable of ionizing radiation-curable type, in which a thermoplastic resin film and a tissue paper used for heat-sensitive stencil sheet are bonded each other by an resin of the ionizing radiation-curable resin, as disclosed in Re-publication by Japanese Language of PCT Application of Kokusaihyou Hei 1-801872, or a method of fabricating a heat-sensitive stencil sheet which comprises steps of bonding and laminating a thermoplastic resin film and a tissue paper together with an alcohol solution of an ionizing radiation-curable type of polymer or oligomer and, after drying, exposing a resultant combined web to ultraviolet ray or electron beam for reinforcement, as disclosed in Japanese Unexamined Patent Publication of Tokkai Hei 01-154796.

However, the foregoing conventional methods do not yet satisfy the primary requirements for any heat-sensitive stencil sheet such as; (1) an excellent passing-through of printing ink, (2) the ease of perforation, (3) no releasing of the fibers, (4) the resistance to printing action, and (5) the high productivity.

The conventional tissue papers for heat-sensitive stencil sheet, the heat-sensitive stencil sheets, and their fabricating methods have the following drawbacks.

As common, the conventional tissue papers for heat-sensitive stencil sheet including natural fibers are impregnated with a resin material by a known manner for preventing a change in dimensions thereof, which is caused by absorbing to and removing from of the moisture the natural fibers, and liberating of the fibers from tissue papers. Accordingly, the tissue paper may easily be deformed by a stress applied during bonding of it with the thermoplastic resin film, and after that, if it is released from its stressed state, it springs back to its original dimensions, in spate of having been bonded with the thermoplastic resin film, thereby it will cause a degrading in the surface smoothness of the thermoplastic resin film, and it will hence be found difficult to control the laminating action.

Although conventional tissue paper used for heat-sensitive stencil sheet made of a synthetic fiber material is subjected to heat-pressing process for increasing the bonding strength between the fibers, it may be increased in the density while having no removal of the fibers, hence declining the passing-through of printing ink. On the contrary, if the tissue paper is pressed down at a lower temperature, though it is improved in passing-through of ink, it may have the fibers removal. For compensating these problems, the conventional tissue paper used for heat-sensitive stencil sheet can favorably be reinforced with a resin material, however, as the synthetic fibers are lower than the natural fibers in the physical strength, the above described disadvantage will more be emphasized with the synthetic fiber contained in tissue paper.

There is known method for producing a heat-sensitive stencil sheet supported by a tissue paper as a supporting substrate, which comprises steps of placing the two kinds of material layers in integrated form of plastic resin and tissue paper, then impregnating them at once with resinous solution to make impregnated them with resin, drying and exposing to ionizing radiation ray or electron beam for bonding with each other allows the combined web being favorably controlled. By this method, the controlling of the laminating is case, however, as the resin is diluted in a solution for easy application thereof, there is found difficult problem of the tendency that the resin solution is concentrated at the interface between the thermoplastic resin film and the contact end of the tissue paper as shown in FIG. 1. This interrupts the perforation of the thermoplastic resin film, and causes no sharp print images.

For implementing high quality prints, there is provided method of fabricating a heat-sensitive stencil sheet, in which a porous resin layer is provided between the thermoplastic resin film and the tissue paper. However, the use of a solution diluted with solvent is also questioned because it enters in and plugs up the pores in the porous resin layer. Also, if the solvent is an organic material, it may dissolve the porous resin layer itself.

In case that the thermoplastic resin film and the tissue paper used for heat-sensitive stencil sheet are bonded each other by an ionizing radiation-curable resin, the tissue paper used for heat-sensitive stencil sheet has to be impregnated with the ionizing radiation-curable resin for controlling laminating action, otherwise results the difficulty in controlling of above mentioned laminating.

SUMMARY OF THE INVENTION

It is hence an object of the present invention to provide an improved tissue paper used for heat-sensitive stencil sheet, an improved heat-sensitive stencil sheet, and method of fabricating the same which can eliminate the above drawbacks.

Through a series of experiments, we have found means for overcoming the foregoing drawbacks. The means may basically include the use of a tissue paper used for heat-sensitive stencil sheet, the tissue paper is made of natural fibers, synthetic fibers, or their mixture, which being impregnated with an ionizing radiation-curable resin material, and thereby, the primary requirements, such as (1) an excellent passing-through of printing ink, (2) the case of perforation, (3) no releasing of the fibers, (4) a prolonged durability for printing action, and (5) the productivity, are attained.

Namely, the above and other objects of the present invention are achieved by the features of the present invention which comprise (1) a tissue paper used for heat-sensitive stencil sheet comprising natural fiber, synthetic fibers, or their mixture, wherein the tissue paper used for heat-sensitive stencil sheet is being impregnated with an ionizing radiation-curable resin (identical as claim 1);

(2) a multi-layer paper consisting of two or more layers of tissue papers for heat-sensitive stencil sheet, characterized by the each tissue paper are combined one other, so that they are in a mode separable to one other for separated utilizing thereof, and the multi-player paper is being impregnated with an ionizing radiation-curable type of resin (identical as claim 2);

(3) a tissue paper used for heat-sensitive stencil sheet according to paragraph (1), or a multi-layer paper according to paragraph (2), where the tissue paper or the multi-layer paper is being impregnated with an ionizing radiation-curable resin by size-press processing (identical as claim 3);

(4) a tissue paper used for heat-sensitive stencil sheet according to paragraph (2), wherein the tissue paper used for heat-sensitive stencil sheet is being impregnated with an ionizing radiation-curable resin by a size press processing;

(5) a tissue paper used for heat-sensitive stencil sheet impregnated with the ionizing radiation-curable resin, wherein the tissue paper used for heat-sensitive stencil sheet is being obtained by separation of a multi-layer paper according to any paragraphs (2) or (4) (corresponding to claim 4, but not identical);

(6) a tissue paper used for heat-sensitive stencil sheet, wherein the tissue paper used for heat-sensitive stencil sheet is being obtained by radiating a tissue paper used for heat-sensitive stencil sheet according to any one paragraph selected from paragraphs (1), (3) and (5) to an electron beam (corresponding to claim 5, but not identical);

(7) a heat-sensitive stencil sheet having a thermoplastic resin film being bonded to a tissue paper used for heat-sensitive stencil sheet, wherein the tissue paper is being obtained by irradiating a tissue paper given by separation process of a multi-layer paper according to any paragraphs (2) or (4) to an electron beam;

(8) a heat-sensitive stencil sheet, in which there are provided a thermoplastic resin film, the thermoplastic film being, at surface of one side thereof, bonded by point-bonding (spot-bonding) to a tissue paper used for heat-sensitive stencil sheet according to any one paragraph selected from paragraphs (1), (3), (5) and (6), and an anti-sticking layer on the other surface of the thermoplastic resin film (corresponding to claim 6, but not identical); and, (9) a heat-sensitive stencil sheet, wherein there are provided a porous resin layer on one side of the thermoplastic resin film, and thereto is provided a tissue paper used for heat-sensitive stencil sheet, the tissue paper is being impregnated with an ionizing radiation-curable resin and being bonded the thermoplastic resin film by point-bonding with using an ionizing radiation-curable resin, and on the other side of the thermoplastic resin film is provided with an anti-sticking layer (corresponding to claim 7).

Also the above and other objects of the present invention are achieved by the other features of the present invention which comprise: (10) a method of fabricating a tissue paper used for heat-sensitive stencil sheet, the tissue paper is made of natural fibers, synthetic fibers, or their mixture, and being impregnated with an ionizing radiation-curable resin, comprising step of impregnating the tissue paper used for heat sensitive stencil sheet with an ionizing radiation-curable resin by a size-press processing;

(11) a method of fabricating a multi-layer paper consisting of a plural layer of tissue papers for heat-sensitive stencil sheet in which each tissue paper are combined one other, so that they are in a mode separable to one other for their separated utilizing, comprising step of impregnating the multi-layer paper with a ionizing radiation-curable resin by a size press processing;

(12) a method of fabricating a heat-sensitive stencil sheet comprising steps of; placing a tissue paper used for heat-sensitive stencil sheet according to any one paragraph selected from paragraphs (1), (3), (5) and (6) on one side of a thermoplastic resin film or a porous resin layer provided on a thermoplastic resin film, and irradiating the placed tissue paper to an electron beam thereby perfecting bonding between the tissue paper and one side of the thermoplastic resin film or the porous resin layer provided on the thermoplastic resin film (corresponding to claim 8, but not identical); and,

(13) a method of fabricating a heat-sensitive stencil sheet comprising steps of; further applying an ionizing radiation-curable resin onto one side of a tissue paper used for heat-sensitive stencil sheet according to any one paragraph selected from paragraphs (1), (3), (5) and (6), contacting the resin-applied side of the tissue paper with one side of a thermoplastic resin film or a porous resin layer provided on a thermoplastic resin film, irradiating the contacted one to an electron beam, thereby perfecting bonding between the tissue paper and one side of the thermoplastic resin film or the porous resin layer provided on the thermoplastic resin film (corresponding to claim 9, but not identical).

DETAILED DESCRIPTION OF THE PREFERRED EMBODIMENTS

The present invention will now be explained in more detail below.

Figure 1:
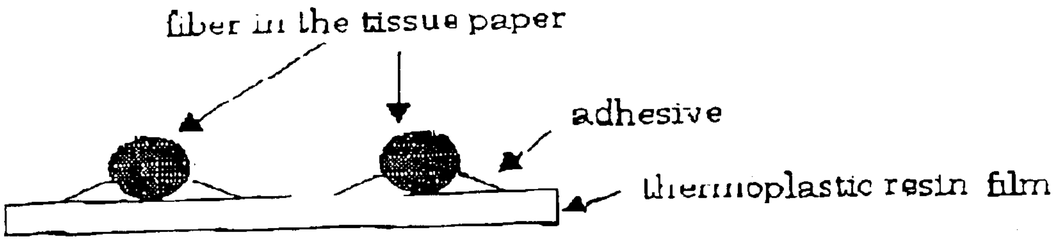
FIG. 1 is a cross sectional view of a conventional heat-sensitive stencil sheet showing a typical bonding condition.
Figure 2:
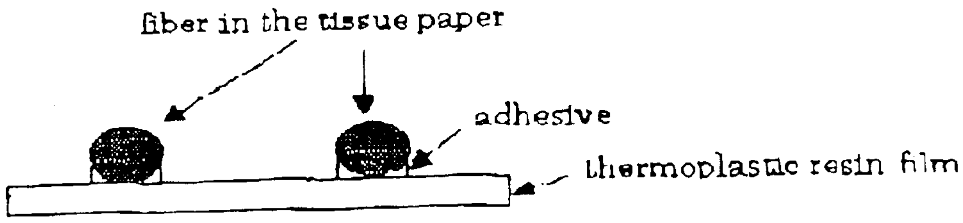
FIG. 2 is a cross sectional view of a heat-sensitive stencil sheet of the present invention showing a bonding condition.

As a first feature of the present invention, there is provided a tissue paper used for heat-sensitive stencil sheet comprising natural fibers, synthetic fibers, or their mixture as is impregnated with an ionizing radiation curable type of resin material as, described in above paragraph (1). As the tissue paper used for heat-sensitive stencil sheet is impregnated with the ionizing radiation-curable resin material, it can be bonded with no use of an adhesive to one side of a thermoplastic resin film or a porous resin layer coated side of a porous resin layer coated thermoplastic resin film. Also, as the tissue paper has preliminarily been impregnated with the resin material, it can be accompanied with a point bonding (spot-bonding) which has a width less than or nearly equal to that of fiber as shown in FIG. 2, but not FIG. 1, so as to favor the perforation. Moreover, when the tissue paper is significantly stressed before bonded to one side of a thermoplastic resin film or the coated side of a porous resin layer-coated thermoplastic resin film, it can be cured by application of electron beam or ultraviolet ray, without any deformation. This allows the surface smoothness of the film to be controlled with ease during the laminating action, thus improving the productivity.

The tissue paper impregnated with an ionizing radiation-curable resin material according to the present invention may be made of materials selected from (1) natural fibers such as mulberry, mitsumata, or Manila hemp, (2) synthetic fibers such as rayon, vinylon, polyester, or nylon, and (3) a mixture of (1) a natural fiber and (2) a synthetic fiber. The diameter of each fiber is preferably not greater than 40 $\mu$m and more preferably ranges 1 to 20 $\mu$m. If size of the diameter is smaller than 1 $\mu$m, its tensile strength will be declined. When exceeding 40 $\mu$m, the passing-through of printing ink will be disturbed thus producing blank spots called voids in prints. Also, the length of each fiber ranges preferably from 0.1 to 10 mm and more preferably from 1 to 6 mm. If the length is shorter than 0.1 mm, the tensile strength will be declined. When exceeding 10 mm, the dispersion will hardly be uniform.

The basis weight of the thermoplastic tissue paper used for heat-sensitive stencil sheet is preferably 5 to 20 g/m$^2$ and more preferably 8 to 15 g/m$^2$. If the basis weight exceeds 20 g/m$^2$, the passing-through of printing ink will be declined thus lowering the image sharpness in prints. When less than 5 g/m$^2$, the deposition of paper will be difficult.

The ionizing radiation-curable resin material used in the present invention may include polymers having double bonds of radial polymeric and relatively low weight, which are instanced as (meth)acrylate-polyesters, -polyethers, -acryl resins, -epoxy resins, -urethane resins, and a radical polymeric mono-functional monomer, multi-functional monomer, or the like, and if polymeric cross-linking by means of ultraviolet light is intended, a photo polymerization-initiator is also included. Any these known ionizing radiation-curable type of resin may be used in the present invention. From the point of eliminating possible danger to make progress the curing action on the resin material with ultraviolet ray during stored, the ionizing radiation-curable type of resin material may not contain the photo polymerization-initiator, and can preferably be cured by electron beam for improving the storage stability of the tissue paper after the resin is applied. And from both points of strength and flexibility, urethane-acrylate type of resin is favorably used as the ionizing radiation-curable resin material.

The urethane-acrylate used in the present invention can be obtained by reacting with multi-functional alcohol, multi-functional isocyanate and acrylates having hydrogen group. Characteristic examples may include an additive-reaction product, of polyether-diols, which is produced by reaction of multi-functional organic acid such as sabacic acid, malcic acid, terephthalic acid and the like, and multi-valent alcohols (such as ethyleneglycohol, propyleneglycohl, 1,4-buthyleneglycohol, 1,6-hexane-diol, and the like), diisocyanates (such as tolylenediisocyanate, 4,4'-diphenylmethanediisocyanate, hydrogenated tolylenediisocyanate, isophoronediisocyanate,1,6-hexamethylenediisocyanate and the like), and 2-hydroxyethyl-acrylate, and an additive-reaction product of polyether-diols (such as polyethleneglycohol, polypropyleneglycohol, polytetramethyleneglycohol, and the like), diisocyanates (such as tolylenediisocyanate, 4,4'-diphenylmethanediisocyanate, hydrogenated tolylenediisocyanate, isophoronediisocyanate,1,6-hexamethylenediisocyanate and the like), and 2-hydroxyethyl-acrylate, and the like.

Characteristic examples of the mono functional monomer are (meth)acrylic ester, (meth)acryl amide, aryl compound, vinyl ethers, vinyl esters, vinyl isomer cyclization compound, N-vinyl compound, styrene, (meth)acrylic acid, crotonic acid, itaconic acid, and other vinyl monomer. Characteristic examples of the multi-functional monomer are diethylene glycol di(methy)acrylate, triethylene glycol di(meth)acrylate, tetraethylene glycol di(meth)acrylate, trimethylol propane tri(meth)acrylate, pentaerythlytol tetra (meth)acrylate, dipentaerythlytol hexa(meth)acrylate, and tris(β-(meth)acryloiroxyethyl)isocyanurate.

As a second feature of the present invention, there is rovided a a multi-layer paper consisting of a two or more layers of tissue papers for heat-sensitive stencil sheet, in which the each tissue paper are combined one other, so that they are in a mode separable to one other for each utilization thereof, and the multi-layer paper is being impregnated with an ionizing radiation-curable type of resin, as described in paragraph (2).

With regard to a paper called a milled-combined paper which is obtained by a milling process comprising steps of accompanying plural layers in wetted state to a piled up state thereof and drying it, a method for producing two or more tissue papers at once from the milled-combined paper is now found out, in which, the strength against separation at inner surface between paper layers or the strength against peeling at inner layer of an intermediate paper positioned in inside of a multi-layer paper consisting three of more layers of paper is limited within a determined lowered level, in accordance with the present invention. Methods of the present invention are applicable effectively to the above-mentioned method for producing two or more tissue papers at once from a multi layer paper.

In other words, in the case of a multi-layer paper consisting of two or more layers combined one other so that they are in a state separable to one other for each utilization thereof, if a known processing by resin is applied to tissue papers being piled up, separation at inter layer is difficult, and a processing by resin amounted to making a separable condition of inter layer is also questioned, because it may release fibers from the paper layer or result a lesser strength than that required for the paper.

Of cause, the processing by resin can executed after separating a plural of processing is however required for every separated papers, thus serious problem is caused with a missing benefit of productivity.

With accordance to the present invention, although two or more paper layers in the state being interposed thereof are impregnated with ionizing radiation-curable resin, the resin is not cured as far as electron beam or ultra violet ray is not effected, therefore easy separation is capable, and after separated one other, the obtained one is combined with a thermoplastic film or a porous resin layer provided on a thermoplastic film, then exposed to an irradiation of electron beam or ultra violet ray, thereby a good enough effect similar to that of the first feature of the present invention can be obtained, with a significantly improved productivity.

When curing by the use of ultraviolet radiation, if necessary but unfavorable in usual, photo polymerization initiator may be involved. Characteristic examples of the photo polymerization initiator are, as mono-functional types, 2-ethylhexyl acrylate, 2-hydroxyethyl acrylate, 2-hydroxypropyl acrylate, 2-hydroxyethyl acryloil phosphate, tetrahydrofurfuryl acrylate, and tetrahydrofurfuryl derivative acrylate, and as multi-functional types, dicyclopentenyl acrylate, dicyclopentenyl oxyethyl acrylate, 1,3-butanediol diacrylate, 1,4-butanediol diacrylate, 1,6-hexanediol diacrylate, diethylene glycol diacrylate, neopentyl glycol 400 diacrylate, polyethylene glycol 400 diacrylate, hydroxyesterpivalylate neopentyl glycol diacrylate, tripropylene glycol diacrylate, 1,3-bis(3'-acryloxyethoxy-2'-hydroxypropyl)-5,5-dimethylhydantoin, hydroxyesterpivalylate neopentyl glycol derivative diacrylate, and dipentaerythlyrol hexacrylate.

And, the use of multi layer paper with separation to fragments thereof makes it possible to give a tissue paper used for heat-sensitive stencil sheet which has a lowered basis weight and an excellent passing-through of ink, both that are difficult to attain by conventional techniques.

A combined web of the two or more layers which are then used as the tissue papers of the present invention may be fabricated from natural fibers such as mulberry, mitsumata, or Manila hemp, synthetic fibers such as rayon, vinylon, polyester, or polyacrylonitryl, and their mixture. These materials can be flowed to, filtered by and deposited on a screen in a known combination paper making machine.

Figure 3:
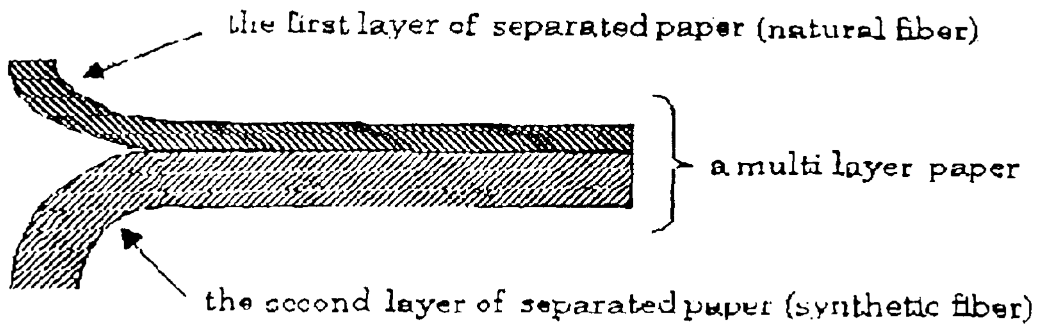
FIG. 3 is a cross sectional view of tissue papers for heat-sensitive stencil sheet which are used after separation from a multi layer paper each other according to the present invention.

For ease of the separation of layers, it is desired to have the fibers of each layer deposited differently. For example, one layer is developed from the natural fibers while the other is developed from the synthetic fibers as shown in FIG. 3. The natural fiber layer creates hydrogen bonds for bonding the fibers together while the synthetic fiber layer has binder fibers bonded to one another by fusion bonding to increase the physical strength. At the interface between the natural fiber layer and the synthetic fiber layer, the binder fibers in the synthetic fiber layer may increase the bonding strength to a level smaller than that in the layers. The basis weight of the layers is preferably 2.0 to 20.0 g/m$^2$ and more preferably 3.0 to 15.0 g/m$^2$. If the basis weight is smaller than 2.0 g/m$^2$, the deposition of paper will be difficult and also the physical strength will be lower for the resultant heat-sensitive stencil sheet. When exceeding 20.0 g/m$^2$, the passing-through of printing ink will be declined.

Figure 4:
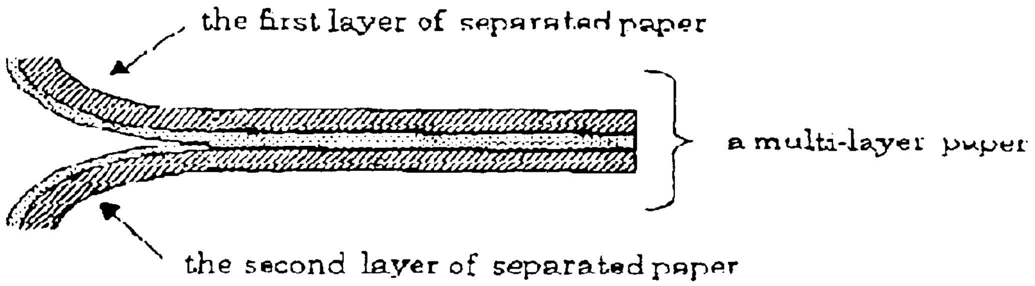
FIG. 4 is a cross sectional view of tissue papers for heat-sensitive stencil sheet which are used after separation from a multi-layer paper each other according to the present invention.

An alternative method of fabricating two identical layers at once is provided as illustrated in FIG. 4.

In the method, an intermediate layer may preferably be fabricated from not the binder fibers but more slightly sized fibers which provide a less level of the bonding strength. As the intermediate layer between the two layers has the fibers not tightly bonded to one another, the removal of the fibers may be increased. This drawback can however be eliminated by preliminarily impregnating with the ionizing radiation resin material which is cured in the laminating action.

As a third feature of the present invention, there are provided a tissue paper used for heat-sensitive stencil sheet according to paragraph (1), wherein the tissue paper is being impregnated with an ionizing radiation-curable resin by a size-press processing, as described in paragraph (3); and a tissue paper used for heat-sensitive stencil sheet according to paragraph (2), wherein the tissue paper is being impregnated with an ionizing radiation-curable resin by a size press processing.

(5) a tissue paper used for heat-sensitive stencil sheet impregnated with the ionizing radiation-curable resin, wherein the tissue paper used for heat-sensitive stencil sheet is being obtained by separation of a multi-layer paper according to any paragraphs (2) or (4) (corresponding to claim 4, but not identical);

(6) a tissue paper used for heat-sensitive stencil sheet, wherein the tissue paper used for heat-sensitive stencil sheet is being obtained by exposing a tissue paper used for heat-sensitive stencil sheet according to any one paragraph selected from paragraphs (1), (3) and (5) to ionizing irradiation (corresponding to claim 5, but not identical);

With regard to the size-press processing in the present invention, though the impregnation of the tissue paper used for heat-sensitive stencil sheet with an ionizing radiation-curable resin may includes, but not limited to, reverse roll coating, gravure coating, offset gravure coating, kiss coating, wire bar coating, blade coating, transfer roll coating, die coating, and the like by controlling viscosity of coating liquid, each those coating techniques are effected from one side of surface only of a substrate to be coated, thus homogeneous impregnation covering whole layer thickness of the tissue paper is hardly effected by those coating techniques. For the easy achievement of a smoothen surface after lamination without releasing of fiber from tissue paper treated, which is also one purpose of the present invention, the size-press processing suited to a impregnating is the most favorable coating, and thereby whole layer thickness of tissue paper used for heat-sensitive stencil sheet is homogeneously impregnated.

As a fourth feature of the present invention, there are provided a tissue paper used for heat-sensitive stencil sheet impregnated with the ionizing radiation-curable type of resin, the tissue paper is that being obtained by separating of a multi-layer paper according to any paragraphs (2) or (4), as described in paragraph (5)

According to the feature of the present invention, it is possible to obtain easy a tissue paper used for heat-sensitive stencil sheet which has a lowered basis weight and an excellent passing-through of ink, both that are difficult to attain by conventional techniques.

As a fifth feature of the present invention, there are provided a tissue paper used for heat-sensitive stencil sheet being obtained by exposing a tissue paper used for heat-sensitive stencil sheet according to any one paragraph selected from paragraphs (1), (3) and (5) to electron beam, as described in paragraph (6); and a tissue paper used for heat-sensitive stencil sheet being obtained by exposing a tissue paper used for heat-sensitive stencil sheet according to any paragraphs (2) or (4) to electron beam, as described in paragraph (7).

The tissue paper used for heat-sensitive stencil sheet by the feature of the present invention, an ionizing radiation curable resin impregnated in the tissue paper used for heat-sensitive stencil sheet is that being cured by exposure to an electron beam as an ionizing irradiation, thereby bonding strength between fibers, strength against stretching, ink passing-through, all those properties are simultaneously required for thermal tissue paper used for heat-sensitive stencil sheet, attained.

Hereinafter, heat-sensitive stencil sheets derived from above-mentioned tissue paper used for heat-sensitive stencil sheets by present invention, and production methods thereof are described below.

As a sixth feature of the present invention, there is provided a heat-sensitive stencil sheet having a thermoplastic resin film which is, at its surface of one side, bonded by point-bonding (spot-bonding) to a tissue paper used for heat-sensitive stencil sheet according to any one paragraph selected from paragraphs (1), (3), (5), (6), and a heat-sensitive stencil sheet according to paragraph (7), an anti-sticking layer on the other surface of the thermoplastic resin film, wherein there is a porous resin layer provided to surface of one side of the thermoplastic resin film, the thermoplastic resin film, on the other surface thereof, is bonded by point-bonding to a tissue paper used for heat-sensitive stencil sheet, an anti-sticking layer, and the tissue paper being impregnated with an ionizing radiation-curable type of resin, as described in paragraph (8).

The heat-sensitive stencil sheet of the present invention allows the tissue paper used for heat-sensitive stencil sheet and the thermoplastic resin film to be ideally bonded to each other, thus improving the ease of perforation and creating sharp images in prints. Also, as the tissue paper is impregnated with an ionizing tissue paper radiation-curable material, its mechanical strength can be improved hence contributing to the economical production of the heat-sensitive stencil sheet, and which exhibits no removal of the fibers and thus is high in the quality. Moreover, as the protective layer to prevent sticking is provided on the film, it can protect a thermal head from sticking with a fused surface of the thermoplastic film, thus it enables the preparation of a master that yields solid image prints.

The anti-sticking layer may be a thin layer containing silicon oil, silicon resin, fluorine resin, a surface active agent, a destaticizer, a heat resistant agent, an anti-oxidization agent, organic particles, inorganic particles, a pigment, a dispersant, an antiseptic agent, and an antifoaming agent. The thickness of the thin layer ranges preferably from 0.005 to 0.4 $\mu$m and more preferably from 0.01 to 0.4 $\mu$m.

The method of forming the anti-sticking layer on the heat-sensitive stencil sheet of the present invention is not limited to but may be made by applying and drying a coated solution layer made of water or a solvent with the use of a roll coater, a gravure coater, a reverse coater, or bar coater.

The thermoplastic resin film according to the present invention may be selected from known polyester, polyamide, polypropylene, polyethylene, polyvinyl chloride, polyvinylidene chloride, and their copolymer. Preferably, polyester film is employed for favorable sensitivity to perforation.

Characteristic examples of the polyester film are polyethylene terephthalate, copolymer of ethylene terephthalate and ethylene-isophthalate, and copolymer of hexamethylene terephthalate and cyclohexanedimethylene terephthalate. For improving the sensitivity to perforation, the copolymer of ethylene terephthalate and ethylene-isophthalate or the copolymer of hexamethylene terephthalate and cyclohexanedimethylene terephthalate is favorably selected.

The thermoplastic resin film used according to the present invention may be doped with, if desired, an flame resist agent, a thermal stabilizer, an anti-oxidant, an ultraviolet absorbent, a destaticizer, a pigment, a dye, an organic lubricant such as wax or fatty acid ester, and antifoaming agent such as polysiloxane. Moreover, the lubricating properties may be applied if necessary. The lubricating properties are implemented by application of, but not limited to, inorganic particles such as clay, mica, titanium oxide, calcium carbonate, kaolin, talc, and wet or dry silica, organic particles such as acrylic acids or styrene, built-in particles, or a surface active agent.

The thickness of the thermoplastic resin film used according to the present invention is preferably 0.1 to 5.0 $\mu$m and more preferably 0.1 to 3.0 $\mu$m. If the thickness exceeds 5.0 $\mu$m, the porous properties will be declined. When smaller than 0.1 $\mu$m, the layer generation stability or the resistance to the printing action will be declined.

As a seventh feature of the present invention, there are provided a heat-sensitive stencil sheet according to paragraph (8), wherein there are provided a porous resin layer on one side of the thermoplastic resin film, and thereto is provided a tissue paper used for heat-sensitive stencil sheet, the tissue paper is being impregnated with an ionizing radiation-curable resin and being bonded the thermoplastic resin film by point-bonding with using an ionizing radiation-curable resin, and on the other side of the thermoplastic resin film is provided with an anti-sticking layer, as described in paragraph (9).

The heat-sensitive stencil sheet by the feature of the present invention, unlike the heat-sensitive stencil sheet by the method defined in above paragraph (8), has the porous resin layer provided between the tissue paper and the thermoplastic resin film hence allowing printing ink to be minutely dispersed as passed through the master. Accordingly, the printing ink can thus produce a quality solid image with its minimum transfer amount. Also, as the print through as transfer of the printing ink to the back of a printing paper can be minimized thus inhibiting strike-through. Moreover, the bonding between the porous resin layer and the tissue paper used for heat-sensitive stencil sheet can favorably be implemented as illustrated in FIG. 2, hence minimizing declination in the passing-through of printing ink.

Figure 6:
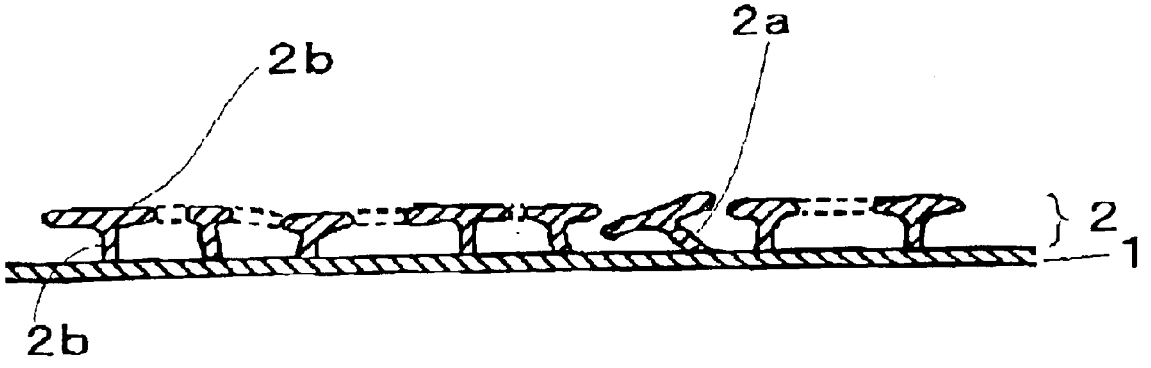
FIG. 6 is a schematic sectional view of one embodiment of a porous resin layer according to the present invention.
Figure 7:
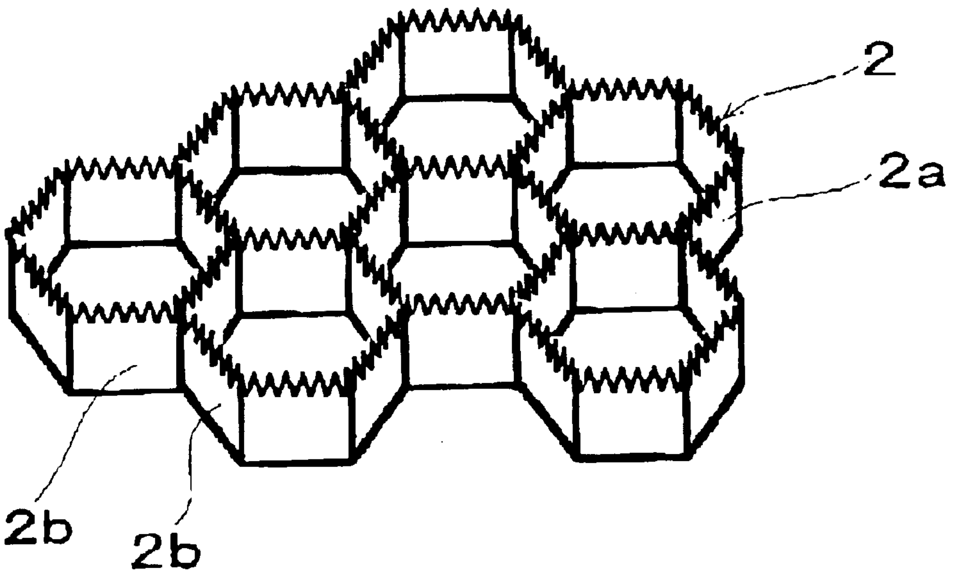
FIG. 7 is a perspective view of another embodiment of a porous resin layer according to the present invention.
Figure 8:
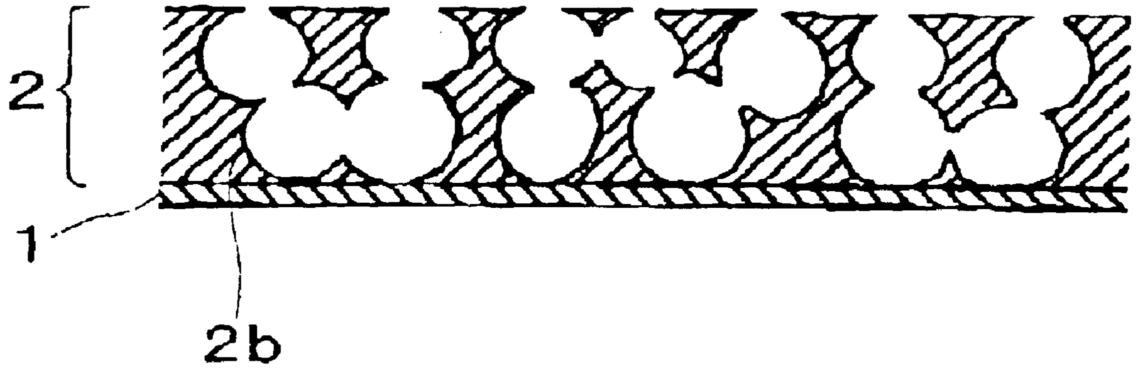
FIG. 8 is a schematic sectional view of a further embodiment of a porous resin layer according to the present invention.
Figure 9:
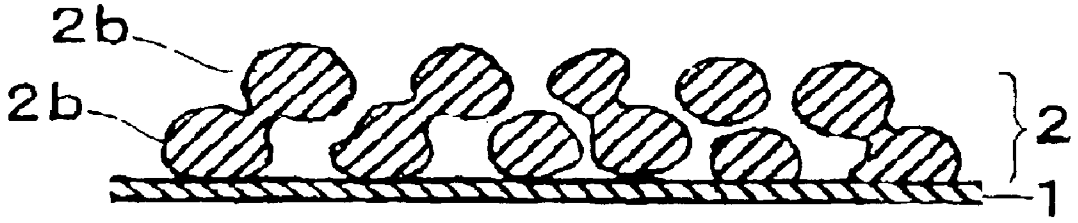
FIG. 9 is a schematic sectional view of a still further embodiment of a porous resin layer according to the present invention.

The term "porous resin layer" used herein means a porous layer of the foamy shape assembly, including a multiplicity of wall 2*a* defines cells equipped with ceilings 2*b*, assuming that the surface of the film 1 is a floor, those walls 2*a* and ceilings 2*b* constitute resin layer 2, as instanced in FIG. 6, a honey combed structure equipped with walls 2*b* instead of the ceilings, and with the exception of the floor, as instanced in FIG. 7, a group of foamy-like cells as instanced in FIG. 8 is an assembly of granular-shaped or fabric-shaped resin segments pieces 2*b* coupled together, instead of the ceilings and walls, as instanced in FIG. 9, and the like. However the porous resin layer is not restricted to these instructions.

The porous resin layer is favorably produced by depositing a resin solution or dispersion by using a solvent, or solvents including water.

Average diameter of the pores of the abovementioned porous resin layer is possible to be a smaller than that of conventional porous resin layer, and especially, a range from 5 $\mu$m to 20 $\mu$m of average pore size is particularly suited to a W/O-type (water in oil type) emulsion ink which has a excellent dispersibility and therefore is used for general stencil printing or in other words stencil printing, thus a high quality print which has a excellent solid area is obtained.

In the depth direction of the layer, each pore in the porous resin layer are connected each other, while in the traverse direction of the layer, the each pore are hardly connected, thereby sideward deviated penetration of the ink in heat-sensitive stencil sheet is decreased. Accordingly, by means of the porous resin layer, it is possible to suppress a transmitting of the excess ink. Thereby, in comparison with conventional supporting substrates which have almost same average size but in fiber of pores as that of the present invention, so-called print-through can be avoided more effectively.

With regard to formulation of the porous resin layer, in view of ink dispersibility, the most favorable one is an assembly of cells having honey combed structure. However in view of manufacturing, a favorable is a foamy film formed by applying a fluid containing a W/O type emulsion as main ingredient onto a thermoplastic film and drying it, because it is producible a stable coating, and if desired, the foamed structure can be altered to the another structure of more similar to honey combed one.

The porous resin layer in the present invention is favorable to have many pores in inside and on surface of the resin layer, in which those pores in inside of the resin layer are connected in thickness direction, from point of ink-passiveness.

The average diameter of the pores in the porous resin layer ranges generally from 1 $\mu$m to 50 $\mu$m, preferably from 3 $\mu$m to 30 $\mu$m and more preferably from 5 $\mu$m to 20 $\mu$m. If the average diameter is smaller than 1 $\mu$m, the passing-through of printing ink will be declined. When the printing ink has a lower level of the viscosity for improving its passing-through, it may smear or blur during the printing action and finally escape from both ends of the printing drum or the trailing end of the printing master. Also, the porous resin layer will be declined in the porosity and the perforation with a thermal head will significantly be interrupted. When its average pore diameter exceeds 50 $\mu$m, the porous fiber layer will fail to retain the printing ink which thus runs out from between the printing drum and the film, hence causing unwanted stains or smears. Namely, the printing action may produce unfavorable quality of prints when the average diameter is either too large or small, resulting smearing, blurring or set-off. When the porous resin layer is arranged with an average pore diameter of not greater than 20 $\mu$m, it causes the passing-through of printing ink to become difficult as its thickness increases. Accordingly, the transfer of printing ink to a sheet of paper to be printing will be controlled by modifying the thickness of the layer. If the layer is not uniform in the thickness, it may produce printing unevenness.

The thickness of the porous resin layer ranges preferably from 2 $\mu$m to 50 $\mu$m and more preferably from 5 $\mu$m to 30 $\mu$m. If its thickness is smaller than 5 $\mu$m, the porous resin layer may hardly remain behind the perforations produced by the thermal head and fails to control the transfer of the printing ink, thus causing back printing smears. The effect of controlling the transfer of printing ink is increased in proportion to the thickness of the porous resin layer. As a result, the transfer of printing ink to a sheet of paper to be printed can be controlled by modifying the thickness of the porous resin layer.

The density of the porous resin layer ranges generally from 0.01 g/cm$^3$ to 1 g/cm$^3$ and preferably from 0.1 g/cm$^3$ to 0.7 g/cm$^3$. If its density is smaller than 0.01 g/cm$^3$, the porous resin layer will be declined in the physical strength and become fragile.

The amount of the porous resin layer is 0.1 to 10 g/cm$^2$, preferably 0.5 to 7.0 g/cm$^2$, and more preferably 1.0 to 5.0 g/cm$^2$. If its amount is too great, the porous resin layer may interrupt the passing-through of printing ink thus declining the quality of prints. When not greater than 0.1 g/cm$^2$, the transfer of printing ink may be controlled with much difficulty. When exceeding 10 g/cm$^2$, the passing-through of printing ink will be declined.

The porous resin layer may be made from vinyl resins such as polyvinyl acetate, polyvinyl butyral, vinyl chloride-vinyl acetate copolymer, vinyl chloride-vinylidene chloride copolymer, vinyl chloride-acrylonitryl copolymer, or styrene-acrylonitryl copolymer, polyamide such as polybutylene or nylon, and cellulose derivatives such as polyphenyl oxide, (meth)acrylic ester, polycarbonate, polyurethane, acetyl cellulose, acetylbutyl cellulose, or acetylpropyl cellulose. Alternatively, two or more different resins may be mixed.

The porous resin layer may be doped with an additive such as a filler for determining the formation, the strength, and the pore diameter, if necessary. The fillers include pigments, powder, and fabrics. The filler is preferably provided in the form of needle-like configuration. The filer may be selected from mineral needle fillers such as magnesium silicate, sepiolite, potassium titanate, wollastonite, zonotolite, or gypsum fiber, synthetic mineral needle fillers such as non-oxide needle whisker, oxide whisker, or bi-oxide whisker, and sheet fillers such as mica, glass flake, or talc.

The pigment may be selected from inorganic or organic pigments, organic polymers such as polyvinyl acetate, polyvinyl chloride, or polyacrylic ethyl, zinc oxide, titan dioxide, calcium carbonate, and silica. Namely, Micro-capsule, Matsumoto micros-sphere, a product of Matsumoto Oil Pharmacy can be used.

The additive may preferably be 5% to 200% in relation to the resin. If not greater than 5%, the additive will hardly increase the bending rigidity. When the additive exceeds 200%, the bonding to the film will be declined.

The porous resin layer may be doped with a destaticizer, stick protector, a surfactant, an antiseptic agent, and an antifoaming agent.

Next, methods of forming the porous resin layer in the heat-sensitive stencil sheet of the present invention will be described.

As described above, The porous resin layer used according to the present invention is preferably arranged to have a structure where there are a multiplicity of pores in the interior and surface thereof. More preferably, the pores are provided continuously along the thickness direction in the porous layer for ease of the passing-through of printing ink. The porous resin layer is favorably produced by depositing a resin solution or dispersion by using a solvent, or solvents including water.

A first porous resin layer forming method involves applying and drying a liquid coating produced by dissolving and/or dispersing a resin material into a solvent mixture of a good solvent and a poor solvent. It is necessary to have the good solvent arranged volatile at a lower temperature than that of the poor solvent. When the good solvent and the poor solvent are provided one type each, the boiling point of the good solvent has to be relatively lower than that of the poor solvent. As the good solvent and the poor solvent are arbitrarily selected, their difference in the boiling point ranges preferably from 15 to 40° C. for forming the porous resin layer with desired properties. If the difference in the boiling point is lower than 10° C., the two solvents exhibits a small difference in the evaporating duration and may develop a less porous structure. When the boiling point of the poor solvent is too high, the drying takes a considerable length of time thus declining the productivity. It is hence desires that the boiling point of the poor solvent is not higher than 150° C.

The concentration of the resin in the liquid coating ranges from 5% to 30% depending on the type. If lower than 5%, the diameter of the pores will be too large or the porous resin layer will be irregular in the thickness. When the concentration exceeds 30%, the porous resin layer will hardly be developed. Even if the porous resin layer is developed, its pore diameter may be decreased thus declining the properties.

The average diameter of the pores in the porous resin layer depends significantly on the poor solvent in the atmosphere. The higher the ratio to the good solvent, the greater the rage of aggregation becomes thus increasing the pore average diameter.

As the dosage of the poor solvent is varied depending on the resin type and the solvent type, it has to be determined through experiments. In common, the greater the dosage of the poor solvent, the grater the pore average diameter in the porous resin layer becomes. However, if the dosage of the poor solvent is too large, the resin itself may be separated out making the liquid coating unstable.

A second method of forming the porous resin layer is arranged, as disclosed in Japanese Patent Laid-open Publication (Heisei)11-235855, where a fluid coating W/O emulsion is applied and dried on a thin film. A resin (which may include additives such as a filler and an emulsifier) in the fluid coating is turned to a resultant layer structure while water evaporated leaves the pores through which printing ink is passed. In this method, the porous layer may be doped with desired additives such as a filler and an emulsifier for determining the shape, the strength, the pore diameter, and the stiffness. The filler may preferably be selected from needle, sheet, and fiber types.

The W/O emulsion is preferably based on a highly lipophilic surface active agent having 4 to 6 of HLB (hydrophilic-lipophilic balance). The W/O emulsion may be more stable and uniform when a surface active agent having 8 to 20 of HLB is mixed in the water. Alternatively, a polymer surface active agent may be used for creating a stable and uniform emulsion. It is also a good idea for creating a stable and uniform emulsion to add its water with a thickening agent such as polyvinyl alcohol or polyacrylic acid.

The method of forming the porous resin layer is not limited to the above described methods.

The liquid coating on the thermoplastic resin film for forming the porous resin layer according to the present invention may be applied by using means selected from blade, transfer roll, wire bar, reverse roll, gravure, die, and other known coating techniques. The die coating method is preferably employed since its airtight system can minimize evaporation of the solvent thus to maintain the liquid coating stable.

As an eighth feature of the present invention, there are provided a method of fabricating a tissue paper used for heat-sensitive stencil sheet according to paragraph (1), comprising step of impregnating a tissue paper used for heat-sensitive stencil sheet with a ionizing radiation-curable resin by a size-press processing, as described in paragraph (10), and a method of fabricating a multi-layer paper according to paragraph (2) comprising step of impregnating a multi-layer paper with a ionizing radiation-curable resin by a size-press processing, as described in paragraph (11).

With regard to the size-press processing in the present invention, though the impregnation of the tissue paper used for heat-sensitive stencil sheet with an ionizing radiation-curable resin may includes, but not limited to, reverse roll coating, gravure coating, offset gravure coating, kiss coating, wire bar coating, blade coating, transfer roll coating, die coating, and the like by controlling viscosity of coating liquid, each those coating techniques are effected from one side of surface only of a substrate to be coated, thus homogeneous impregnation covering whole layer thickness of the tissue paper is hardly effected by those coating techniques.

For the easy achievement of a smoothen surface after lamination without releasing of fiber from tissue paper treated, which is also one purpose of the present invention, the size-press processing suited to a impregnating is the most favorable coating, and thereby whole layer thickness of tissue paper used for heat-sensitive stencil sheet is homogeneously impregnated.

Though the viscosity of ionizing radiation-curable resin may be controlled by using dilute, or an organic solvent, a water soluble or dispersible agent may preferably be used in view of the environmental protection or the cost of an extra anti-explosion facility.

Hereinafter, heat-sensitive stencil sheets using above-mentioned tissue paper used for heat-sensitive stencil sheets by present invention, and production methods thereof are specified.

As a ninth feature of the present invention, there are provided a method of fabricating a heat-sensitive stencil sheet comprising steps of; applying an ionizing radiation-curable resin onto one side of a tissue paper used for heat-sensitive stencil sheet according to any one paragraph selected from paragraphs (1), (3), (5), (6) and (7), placing the tissue paper used for heat-sensitive stencil sheet on one side of a thermoplastic resin film or a porous resin layer provided upon a thermoplastic resin film, so as to direct the resin-applied side of the tissue paper used for heat-sensitive stencil sheet facing to the surface to be placed thereon, exposing them to electron beam, thereby perfecting bonding between the tissue paper used for heat-sensitive stencil sheet and one side of the thermoplastic resin film or the porous resin layer provided upon the thermoplastic resin film, as described in paragraph (12);

In accordance of the feature of the present invention, a step of applying an adhesive may eliminate so as to improve the productivity, and also, this allows a laminating process substantially under ideal conditions (as shown FIG. 2). In the laminating process, the tissue paper remains tensioned and thus can be cured without resulted deforming, facilitating to determining a degree of the surface smoothness of the film.

For example, a laminating process using a roller of mirror surface as known process such as a revealed in Japanese Examined Patent Publication of Tokkou Hei 3-52354 is applicable. A tissue paper impregnated with an ionizing radiation-curable resin material is placed over a film running directly on the mirror surface of the roller and exposed to electron beam for curing without receiving no stress, as shown FIG. 5. As the tissue paper being tensioned, it can be cured under a tensioned state and its film surface can consistently be improved in the smoothness on the mirror surface of the roller, as compared with the conventional method where a tissue paper once cured is urged and deformed by an external stress along its contracting direction thus declining the film smoothness.

The amount of the ionizing radiation-curable resin material to be applied to the tissue paper used for heat-sensitive stencil sheet is preferably 5 to 40 percents by weight based on the basis weight of the master and more preferably 10 to 30 percents by weight. If the amount is not higher than 5 percents by weight, the bonding strength will be declined. When exceeding 40 percents by weight, the pores in the tissue paper will be filled with the resin material thus declining the passing-through of printing ink.

The radiation may be carried out by a known technique. For example, when the radiation of electrons is used for curing, its energy ranges from 50 to 1000 keV or preferably 100 to 300 keV and its source may be selected from Cockcroft-Walton, Van de Graaff, resonance transformer, insulating core transformer, linear, electro-curtain, Dynamitron, and high frequency electron accelerators.

When the ultraviolet ray is used for curing, its radiation source is preferably selected from ultra-high-voltage mercury lamp, high-voltage mercury lamp, low-voltage mercury lamp, carbon arc lamp, xenon lamp, and metal halide lamp. For increasing the curing speed, either a metal halide lamp or a no-electrode discharge lamp D bulb is more preferably used which emits a continuous wavelength between 320 to 450 nm.

Figure 5:
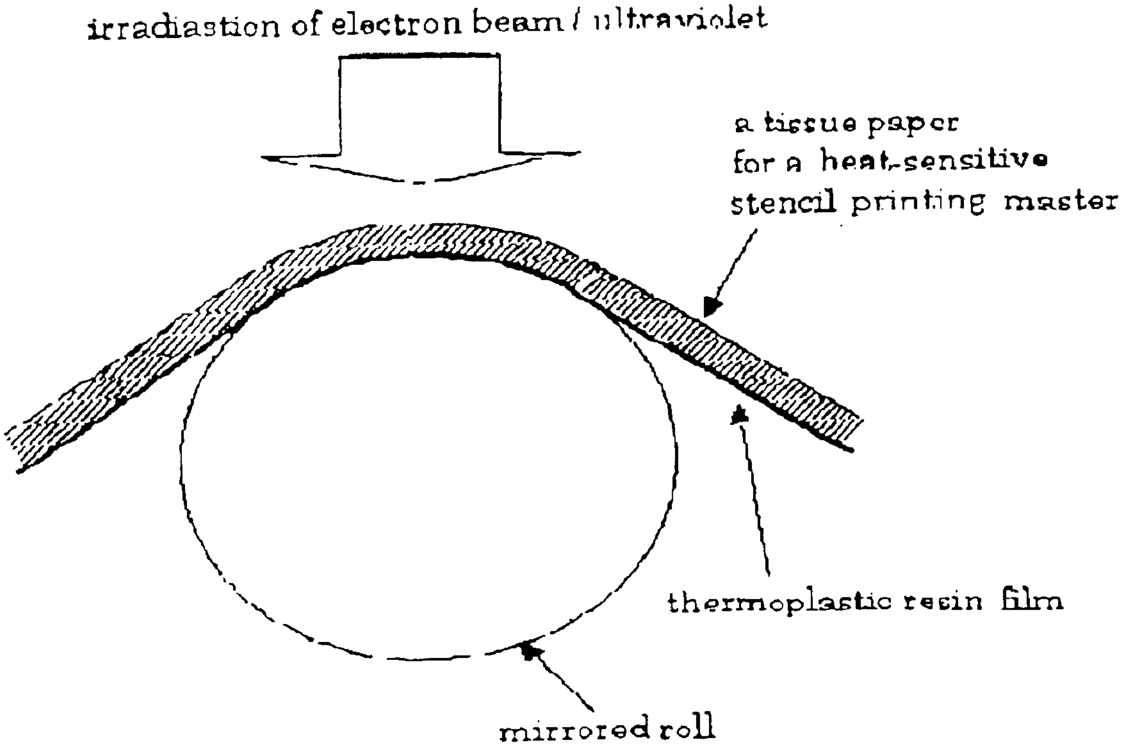
FIG. 5 is a cross sectional view of a laminating process according to the present invention.

In the course of exposure, the tissue paper used for heat sensitive stencil sheet and the thermoplastic resin film or the porous resin layer coated thermoplastic resin film have to be equally tensioned at the surface. This can be implemented when the web is exposed to the radiation while running directly on the mirror surface of a roller as shown in FIG. 5. As the mirror surface of the roller is increased in the temperature by the radiation of electron beam or ultraviolet ray, it may preferably be equipped with a cooling system.

The exposure to the radiation may be either side of the web, the thermoplastic resin film side or the tissue paper used for heat-sensitive stencil sheet side. In view of the efficiency, the tissue paper side of the web may be exposed to the radiation.

For example, the tissue paper impregnated with an ionizing radiation-curable resin material is placed over a film running directly on the mirror surface of a roller and exposed to electron beam or ultraviolet ray for curing without receiving no stress. As the tissue paper remains tensioned, it can be cured under a degree tension and its film surface can consistently be improved in the smoothness on the mirror surface of the roller as compared with the conventional method where a tissue paper once cured is urged and deformed by an external stress along its contracting direction thus declining the film smoothness.

The amount of the ionizing radiation-curable resin material to be applied to the tissue paper used for heat-sensitive stencil sheet is preferably 5 to 40 percents by weight based on the basis weight of the master and more preferably 10 to 30 percents by weight. If the amount is not higher than 5 percents by weight, the bonding strength will be declined. When exceeding 40 percents by weight, the pores in the tissue paper will be filled with the resin material thus declining the passing-through of printing ink.

The radiation may be carried out by a known technique. For example, when the radiation of electrons is used for curing, its energy ranges from 50 to 1000 keV or preferably 100 to 300 keV and its source may be selected from Cockcroft-Walton, Van de Graaff, resonance transformer, insulating core transformer, linear, electro-curtain, Dynamitron, and high frequency electron accelerators.

When the ultraviolet ray is used for curing, its radiation source is preferably selected from ultra-high-voltage mercury lamp, high-voltage mercury lamp, low-voltage mercury lamp, carbon arc lamp, xenon lamp, and metal halide lamp. For increasing the curing speed, either a metal halide lamp or a no-electrode discharge lamp D bulb is more preferably used which emits a continuous wavelength between 320 to 450 nm.

The exposure to the radiation may be either side of the web, the thermoplastic resin film side or the tissue paper used for heat-sensitive stencil sheet side. In view of the efficiency, the tissue paper side of the web may be exposed to the radiation.

As a tenth feature of the present invention, there are provided a method of fabricating a heat-sensitive stencil sheet comprising steps of; further applying an ionizing radiation-curable resin onto one side of a tissue paper used for heat-sensitive stencil sheet according to any one paragraph selected from paragraphs (1), (2), (5), (6) and (7), contacting the resin-applied side of the tissue paper used for heat-sensitive stencil sheet with one side of a thermoplastic resin film or a porous resin layer provided on a thermoplastic resin film, exposing the contacted one to electron beam, thereby perfecting bonding between the tissue paper used for heat-sensitive stencil sheet and one side of the thermoplastic resin film or the porous resin layer provided on the thermoplastic resin film; as described in paragraph (13).

According to the feature of the present invention, the resin treatment step of tissue paper used for heat-sensitive stencil sheet is isolated from the laminating step of the resin treated tissue paper with thermoplastic resin film or the porous resin layer provided on the thermoplastic film. Therefore, necessarily small amount only of adhesive for eliminating the fiber-release from the tissue paper and holding a required strength level of heat-sensitive stencil sheet may impregnate, thereby, the problem in passing through of ink is significantly decreased. Moreover, the bonding between the porous resin layer and the tissue paper used for heat-sensitive stencil sheet can favorably be implemented as illustrated in FIG. 2.

It is essential for providing an ideal condition of bonding (spot-bonding) to apply the solvent-free adhesive to the tissue paper. When the adhesive has a higher level of the viscosity, it may cause removal of the fibers thus creating defectives.

The amount of the ionizing radiation-curable resin material as an adhesive to be applied to the tissue paper used for heat-sensitive stencil sheet is preferably 2 to 30 wt. %/m$^2$ on the basis weight of the master and more referably 5 to 20 wt. %/m$^2$. If the amount is less than 2 wt. %/m$^2$, eliminating the fiber-release from the tissue paper and holding a required strength level of heat-sensitive stencil sheet will be declined. When exceeding 30 wt. %/m$^2$, the pores in the tissue paper will be filled with the resin material thus declining the passing-through of printing ink.

With regard to the irradiation-curable resin used as an adhesive in the present invention, it is required that it is not diluted with solvent while controlled in viscosity by heating, during its applying to the tissue paper so that the release of fibers from the tissue paper and unfavorable coating is avoided. Namely, the adhesive may preferably be heated to decrease its viscosity to below 3000 cps during the application. More preferably, the viscosity ranges from 300 to 1500 cps. If not higher than 300 cps, the bonding condition will hardly be ideal. Also, when the tissue paper is bonded to the porous resin layer, its adhesive may block the pores thus interrupting the passing-through of printing ink. When exceeding 3000 cps, the tissue paper will be increased in the removal of fibers.

If it is diluted with solvent to control viscosity, it spreads over and wets the thermoplastic film, thus an ideal bonding does not attain, and moreover, dissolves the porous resin layer and makes plugging by dissolved one, in the case of laminating with the porous resin layer.

The ionizing radiation-curable type resin used as an adhesive in the present invention may include polymer having radical polymeric double bonds such as relatively low molecular weight polyester or polyether, (meth)acrylate such as acryl resin, epoxy resin, or urethane resin, radical polymeric mono-functional monomer or multi-functional monomer and if desired, a photo polymerization initiator for polymeric cross-linking by means of ultraviolet light. Any known ionizing radiation-curable type resin may be used with equal success according to the present invention. The solvent-free moisture-curable type polyurethane resin as adhesive is favorable, but not limited to it. Examples as a source of the moisture-curable polyurethane resin are included one-part prepolymer produced by reaction between polyol such as polyether polyol or polyester polyol and isocyanate, and two-part curable adhesive of polyol and isocyanate.

The adhesive may preferably be applied to the tissue paper while being heated to have a desired range of the viscosity by a known manner such as, but not limited to, roll coater, gravure, gravure offset, or splay technique.

The amount of the solventless curable type adhesive is preferably 0.05 to 1.0 g/m$^2$ and more preferably 0.1 to 0.7 g/m$^2$. If the amount is not greater than 0.5 g/m$^2$, the bonding strength will be declined. When exceeding 1.0 g/m$^2$, the bonding condition will hardly be ideal.

EXAMPLES

Some examples of the present invention will now be described which are of no limitations.

Example 1

(Preparation of Tissue Paper Used for Heat-Sensitive Stencil Sheet)

A wet-type paper making method was performed to produce a mixture paper of 10.0 g/m$^2$ in the basis weight and 40.2 μm in the thickness from (80 parts by weight of) Manila hemp and (20 parts by weight of) polyester fiber at 0.4 denier. Using a sizing press, the mixture paper was then impregnated with an emulsion water solution of an ionizing radiation-curable resin material (self-emulsifiable polyurethane acrylate, Beamset EM-92 by Arakawa Chemical) to fabricate a tissue paper used for heat-sensitive stencil sheet of the present invention coated with the resin at a dry amount of 2.0 g/m$^2$.

(Preparation of Heat-Sensitive Stencil Sheet)

The tissue paper used for heat-sensitive stencil sheet was placed over a biaxially oriented polyester film of 1.5 μm thick, wound on the mirror surface of a roll with the film inside, and exposed to 5 M rad. of electron beam to produce a combined web. The combined web was then coated at the polyester film side with a 1 wt % solution of water soluble silicon oil (FZ2101 by Nippon Unica) by a gravure coating method and dried to have a heat-sensitive stencil sheet of the present invention. Its evaluation result is shown in Table 1.

Example 2

| (Preparation of Combined Web composed of Thermoplastic Resin Film and Porous Resin Layer) | (parts by weight) |
|---|---|
| Acetal resin (KS-1 by Sekisui Chemical) | 2.5 |
| Talc | 0.8 |
| Surface active layer (SO15U by Nikko Chemical) | 0.1 |
| Surface active layer (KF6012 by Shin-etsu Chemical) | 0.1 |
| Surface active layer (J711 by Johnson) | 0.2 |
| Ethyl acetate | 43.0 |

The above mixture was dissolved, dispersed, and gently added with 20.0 parts by weight of water (HEC 1% solution) while stirred to have a while emulsion coating. The coating was applied onto a biaxially oriented polyester film of 1.5 μm thick by a die coating method so that its dry amount was 2.0 g/m$^2$ which were then dried and taken up as a combined web composed of the thermoplastic resin film and the porous resin layer.

(Preparation of Heat-Sensitive Stencil Sheet)

The tissue paper used for heat-sensitive stencil sheet of Example 1 was placed over the porous resin layer side of the above combined web composed of the thermoplastic resin film and the porous resin layer, wound on the mirror surface of a roll with the film inside, and exposed to 5 M rad. of electron beam to produce another combined web. The another combined web was then coated at the polyester film side with a 1 wt % solution of water soluble silicon oil (FZ2101 by Nippon Unica) by a gravure coating method and dried to have a heat-sensitive stencil sheet of the present invention. Its evaluation result is shown in Table 1.

Example 3

(Preparation of Tissue Paper Used for Heat-Sensitive Stencil Sheet)

A wet-type paper making method was performed to produce a polyester paper of 8.0 g/m$^2$ in the basis weight and 32.0 μm in the thickness from (70 parts by weight of) polyester fiber at 1.0 denier and (30 parts by weight of) oriented polyester fiber at 0.4 denier which were heated to 120° C. Using a sizing press, the mixture paper was then impregnated with an emulsion water solution of an ionizing radiation-curable resin material (self-emulsifiable polyurethane acrylate, Beamset EM-92 by Arakawa Chemical) to fabricate a tissue paper used for heat-sensitive stencil sheet of the present invention coated with the resin at a dry amount of 0.8 g/m$^2$.

(Preparation of Heat-Sensitive Stencil Sheet)

The tissue paper used for heat-sensitive stencil sheet was coated at one side with a one-part urethane adhesive (Polyurethane acrylate, Beamset 255 by Arakawa Chemical) at an amount of 0.4 g/m$^2$ using a roll coater heated to 100° C., placed over a biaxially oriented polyester film of 1.5 μm thick, wound on the mirror surface of a roll with the film inside, and exposed to 5 M rad of electron beam to produce a combined web. The viscosity of the adhesive was about 1000 cps during the application. The combined web was then coated at the polyester film side with a 1 wt % solution of water soluble silicon oil (FZ2101 by Nippon Unica) by a gravure coating method and dried to have a heat-sensitive stencil sheet of the present invention. Its evaluation result is shown in Table 1.

Example 4

(Preparation of Heat-Sensitive Stencil Sheet)

The tissue paper used for heat-sensitive stencil sheet of Example 3 was coated at one side with an ionizing radiation-curable type resin (Polyurethane acrylate, Beamset 502H by Arakawa Chemical) at an amount of 0.3 g/m$^2$ using a roll coater heated to 60° C., placed over the porous resin layer side of the combined web of Example 2 which was composed of the thermoplastic resin film and the porous resin layer, wound on the mirror surface of a roll with the film inside, and exposed to 5 M rad. of electron beam to produce another combined web. The viscosity of the adhesive was about 1500 cps during the application. The combined web was then coated at the polyester film side with a 1 wt % solution of water soluble silicon oil (FZ2101 by Nippon Unica) by a gravure coating method and dried to have a heat-sensitive stencil sheet of the present invention. Its evaluation result is shown in Table 1.

Example 5

(Preparation of Tissue Paper Used for Heat-Sensitive Stencil Sheet)

Using a combination wet-type paper making machine equipped with a circular screen (for depositing a first layer) and a short screen (for depositing a second layer), 7.5 g/m$^2$ in the basis weight of Manila hemp was produced as the first layer and 5.0 g/m$^2$ in the basis weight of a combination of (60 parts by weight of) sheathed polyester fiber at 1.0 denier and (40 parts by weight of) polyester fiber at 0.2 denier was produced as the second layer. The two layers were heated at 120° C. from the polyester fiber layer side to have a porous supporting web. Using a sizing press, the supporting web was then impregnated with an emulsion water solution of an ionizing radiation-curable resin material (self-emulsifiable polyurethane acrylate, Beamset EM-92 by Arakawa Chemical). After dried, the two layers were separated to have tissue paper used for heat-sensitive stencil sheets of the present invention. The resin amount was 1.5 g/m$^2$ at the first (Manila hemp) layer tissue paper used for heat-sensitive stencil sheet and 0.3 g/m$^2$ at the second (polyester fiber) layer tissue paper used for heat-sensitive stencil sheet.

(Preparation of Heat-Sensitive Stencil Sheet)

The second (polyester fiber) layer tissue paper used for heat-sensitive stencil sheet was coated at the first layer removed side with an ionizing radiation-curable type resin (Polyurethane acrylate, Beamset 502H by Arakawa Chemical) at an amount of 0.3 g/m$^2$ using a roll coater heated to 60° C., placed over the porous resin layer side of the combined web of Example 2 which was composed of the thermoplastic resin film and the porous resin layer, wound on the mirror surface of a roll with the film inside, and exposed to 5 M rad. of electron beam to produce another combined web. The viscosity of the adhesive was about 1500 cps during the application. The another combined web was then coated at the polyester film side with a 1 wt % solution of water soluble silicon oil (FZ2101 by Nippon Unica) by a gravure coating method and dried to have a heat-sensitive stencil sheet of the present invention. Its evaluation result is shown in Table 1.

Example 6

(Preparation of Heat-Sensitive Stencil Sheet)

The first (Manila hemp) layer tissue paper used for heat-sensitive stencil sheet of Example 5 was placed over the porous resin layer side of the combined web of Example 2 which was composed of the thermoplastic resin film and the porous resin layer, wound on the mirror surface of a roll with the film inside, and exposed to 5 M rad. of electron beam to produce another combined web. The another combined web was then coated at the polyester film side with a 1 wt % solution of water soluble silicon oil (FZ2101 by Nippon Unica) by a gravure coating method and dried to have a heat-sensitive stencil sheet of the present invention. Its evaluation result is shown in Table 1.

Example 7

(Preparation of Tissue Paper Used for Heat-Sensitive Stencil Sheet)

Using a combination wet type paper making machine equipped with a circular screen (for depositing a first layer) and a short screen (for depositing a second layer), and a third screen (for depositing a third layer), 6.0 g/m$^2$ in the basis weight of (80 parts by weight of) sheathed polyester fiber at 1.0 denier and (20 parts by weight of) polyester fiber at 1.0 denier was produced as the first and third layers and 3.0 g/m$^2$ in the basis weight of polyester fiber at 0.1 denier was produced as the second layer. The two layers were heated at 120° C. from both sides to have a porous supporting web. Using a sizing press, the supporting web was then impregnated with an emulsion water solution of an ionizing radiation-curable resin material (self-emulsifiable polyurethane acrylate, Beamset EM-92 by Arakawa Chemical). After dried, the web was separated at the second layer into two tissue paper used for heat-sensitive stencil sheet of the present invention. The resin amount was 1.0 g/m$^2$ at each the tissue paper used for heat-sensitive stencil sheet.

(Preparation of Heat-Sensitive Stencil Sheet)

The above tissue paper used for heat-sensitive stencil sheet was coated at the not-separated side with an ionizing radiation-curable type resin (Polyurethane acrylate, Beamset 502H by Arakawa Chemical) at an amount of 0.3 g/m$^2$ using a roll coater heated to 60° C., placed over a biaxially oriented polyester film of 1.5 $\mu$m thick, wound on the mirror surface of a roll with the film inside, and exposed to 5 M rad. of electron beam to produce a combined web. The combined web was then coated at the polyester film side with a 1 wt % solution of water soluble silicon oil (FZ2101 by Nippon Unica) by a gravure coating method and dried to have a heat-sensitive stencil sheet of the present invention. Its evaluation result is shown in Table 1.

Example 8

(Preparation of Heat-Sensitive Stencil Sheet)

The same manner as of Example 7 was performed to fabricate a heat-sensitive stencil sheet of the present invention, except that the combined web of Example 2 which was composed of the thermoplastic resin film and the porous resin layer was employed. Its evaluation result is shown in Table 1.

(Comparison 1)

(Preparation of Tissue Paper used for Heat-Sensitive Heat-Sensitive Stencil Sheet Sheet)

A wet-type paper making method was performed to produce a mixture paper of 10.0 g/m$^2$ in the basis weight and 40.2 $\mu$m in the thickness from (80 parts by weight of) Manila hemp and (20 parts by weight of) polyester fiber at 0.4 denier. Using a gravure coating method, the mixture paper was then impregnated with an emulsion water solution of urethane resin (water-dispersion polyurethane acrylate, Adecabontitor HUS-401 by Asahi Denka) to fabricate a conventional tissue paper used for heat-sensitive stencil sheet coated with the resin at a dry amount of 1.0 g/m$^2$.

(Preparation of Heat-Sensitive Stencil Sheet)

The tissue paper used for heat-sensitive stencil sheet was coated at one side with an ionizing radiation-curable type resin (polyurethane acrylate resin, Beamset 502H by Arakawa Chemical) at an amount of 0.3 g/m$^2$ using a roll coater heated to 60° C., placed over a biaxially oriented polyester film of 1.5 μm thick, wound on the mirror surface of a roll with the film inside, and exposed to 5 M rad. of electron beam to produce a combined web. The combined web was then coated at the polyester film side with a 1 wt % solution of water soluble silicon oil (FZ2101 by Nippon Unica) by a gravure coating method and dried to have a conventional heat-sensitive stencil sheet. Its evaluation result is shown in Table 1.

(Comparison 2)

(Preparation of Tissue Paper used for Heat-Sensitive Stencil Sheet)

A wet-type paper making method was performed to produce a conventional tissue paper used for heat-sensitive stencil sheet of 10.0 g/m$^2$ in the basis weight and 40.2 μm in the thickness from (80 parts by weight of) Manila hemp and (20 parts by weight of) polyester fiber at 0.4 denier.

(Preparation of Heat-sensitive Stencil Sheet)

The tissue paper used for heat-sensitive stencil sheet was placed over a biaxially oriented polyester film of 1.5 μm thick, coated at the tissue side with an ionizing radiation-curable type resin (polyurethane acrylate resin, Beamset 502H by Arakawa Chemical) at a dry amount of 1.0 g/m$^2$ using a gravure coating method, dried, wound on the mirror surface of a roll with the film inside, and exposed to 5 M rad. of electron beam to produce a combined web. The combined web was then coated at the polyester film side with a 1 wt % solution of water soluble silicon oil (FZ2101 by Nippon Unica) by a gravure coating method and dried to have a conventional heat-sensitive stencil sheet. Its evaluation result is shown in Table 1.

(Comparison 3)

(Preparation of Tissue Paper Used for Heat-Sensitive Stencil Sheet)

A wet-type paper making method was performed to produce a mixture of (70 parts by weight of) sheathed polyester fiber at 1.0 denier and (30 parts by weight of) oriented polyester fiber at 0.4 denier. The mixture was heated at 120° C. to fabricate a conventional tissue paper used for heat-sensitive stencil sheet of 8.0 g/m$^2$ in the basis weight and 32.0 μm in the thickness.

(Preparation of Heat-Sensitive Stencil Sheet)

The tissue paper used for heat-sensitive stencil sheet was placed over a biaxially oriented polyester film of 1.5 μm thick, coated at the tissue paper side with a water/alcohol solution of an ionizing radiation-curable type resin (self-emulsified polyurethane acrylate resin, Beamset EM-92 by Arakawa Chemical) at a dry amount of 1.0 g/m$^2$ using a gravure coating method, wound on the mirror surface of a roll with the film inside, and exposed to 5 M rad. of electron beam to produce a combined web. The combined web was then coated at the polyester film side with a 1 wt % solution of water soluble silicon oil (FZ2101 by Nippon Unica) by a gravure coating method and dried to have a conventional heat-sensitive stencil sheet. Its evaluation result is shown in Table 1.

(Comparison 4)

(Preparation of Tissue Paper used for Heat-Sensitive Stencil Sheet)

Using a combination wet-type paper making machine equipped with a circular screen (for depositing a first layer) and a short screen (for depositing a second layer), 7.5 g/m$^2$ in the basis weight of Manila hemp was produced as the first layer and 5.0 g/m$^2$ in the basis weight of a combination of (60 parts by weight of) sheathed polyester fiber at 1.0 denier and (40 parts by weight of) polyester fiber at 0.2 denier was produced as the second layer. The two layers were heated at 120° C. from the polyester fiber layer side to have a porous supporting web. The two layers of the web were separated to have conventional tissue paper used for heat-sensitive stencil sheets.

(Preparation of Heat-Sensitive Stencil Sheet)

The second (polyester fiber) layer tissue paper used for heat-sensitive stencil sheet was coated at the not-separated side with an ionizing radiation-curable type resin (Polyurethane acrylate, Beamset 502H by Arakawa Chemical) at an amount of 0.3 g/m$^2$ using a roll coater heated to 60° C., placed over a biaxially oriented polyester film of 1.5 μm thick, wound on the mirror surface of a roll with the film inside, and exposed to 5 M rad of electron beam to produce a combined web. The combined web was then coated at the polyester film side with a 1 wt % solution of water soluble silicon oil (FZ2101 by Nippon Unica) by a gravure coating method and dried to have a conventional heat-sensitive stencil sheet. Its elevation result is shown in Table 1.

(Evaluation for Characteristics)

Each of the masters was loaded to a commercial printer, Preport VT3950 by Ricoh, (at a thermal head solution of 400 dpi), processed by a thermal head perforation technique, and subjected to a printing action with an original having a solid black portion, 50 mm×50 mm and 6-point letters. The printing was conducted at a standard speed.

(1) Removal of Fibers

After the printing action was repeated 10 times, resultant prints were visually examined for attachment of fibers on the platen roll. The evaluation was graded B when no fiber appeared, C when a few fibers appeared, and D when fibers were attached.

(2) Sharpness of Fine Lines

The reproduction of 6-point letters in prints was examined and graded A when the letters appeared sharp with no loss. B when legible with some loss in the letters, D when hardly legible with loss in the letters, and C when least acceptable between B and D.

(3) Print Solidness

Resultant prints were visually examined for solid black print and graded A when (printing ink) uniformly solid without blanks, B when minimum blanks appeared, D when blanks were highly noticeable, and C when least acceptable between B and D.

TABLE 1-1

| | coating weight of | tissue paper used for heat-sensitive stencil sheet | | | resin impregnated | |
|---|---|---|---|---|---|---|
| | porous resin layer (g/m$^2$) | type | basis weight (g/m$^2$) | thickness (μm) | resin type | coating weight (g/m$^2$) |
| Ex. 1 | — | mixture paper | 10.0 | 40.2 | EM92 | 2.0 |
| Ex. 2 | 2.0 | mixture paper | 10.0 | 40.2 | EM92 | 2.0 |
| Ex. 3 | | polyester paper | 8.0 | 32.0 | EM90 | 0.8 |
| Ex. 4 | 2.0 | polyester paper obtained by separation | 8.0 | 32.0 | EM92 | 0.8 |
| Ex. 5 | 2.0 | polyester paper obtained by | 5.0 | 25.0 | EM92 | 0.3 |

TABLE 1-1-continued

| | coating weight of porous resin layer (g/m²) | tissue paper used for heat-sensitive stencil sheet type | basis weight (g/m²) | thickness (μm) | resin impregnated resin type | coating weight (g/m²) |
|---|---|---|---|---|---|---|
| Ex. 6 | 2.0 | separation natural fiber paper obtained by separation | 7.5 | 35.4 | EM92 | 1.5 |
| Ex. 7 | — | polyester paper obtained by separation | 7.5 | 30.1 | EM02 | 1.0 |
| Ex. 8 | 2.0 | polyester paper obtained by separation | 7.5 | 30.1 | EM92 | 1.0 |
| Com. Ex. 1 | — | mixture paper | 10.0 | 40.2 | Poly-urethane HUX-401 | 1.0 |
| Com. Ex. 2 | — | mixture paper | 10.0 | 40.2 | — | — |
| Com. Ex. 3 | — | polyester paper | 8.0 | 32.0 | — | — |
| Com. Ex. 4 | — | polyester obtained by separation | 8.0 5.0 | 25.0 | — | — |

TABLE 1-2

| | adhesive resin type | coating weight (g/m²) | evaluation result of tissue paper used film heat-sensitive stencil sheet surface smoothness of film | removal of fibers | sharpness of fine lines | print solid-ness |
|---|---|---|---|---|---|---|
| Ex. 1 | — | 2.0 | excellent | B | B | B |
| Ex. 2 | — | 2.0 | excellent | B | A | B |
| Ex. 3 | Beamset 255 | 0.8 | excellent | B | B | B |
| Ex. 4 | Beamset 502H | 0.8 | excellent | B | A | A |
| Ex. 5 | Beamset 502H | 0.3 | excellent | B | A | A |
| Ex. 6 | — | 1.5 | excellent | B | A | B |
| Ex. 7 | Beamset 502II | 1.0 | excellent | B | B | B |
| Ex. 8 | Beamset 502H | 1.0 | excellent | D | A | A |
| Com. Ex. 1 | Beamset 502H | 1.0 | many small wrinkles | B | D | D |
| Com. Ex. 2 | Beamset 502H | — | excellent | B | D | C |
| Com. Ex. 3 | — | — | excellent | B | C | C |
| Com. Ex. 4 | Beamset 502H | — | many small wrinkles | D | D | B |

As apparent from the foregoing detailed and specified description, the present invention allows the tissue paper used for heat-sensitive stencil sheet to be impregnated with an ionizing radiation-curable type resin material for ease of bonding to one side of a thermoplastic resin film or a porous resin layer coated side of a porous resin layer coated thermoplastic resin film. Accordingly, the tissue when stressed by tension during the lamination can be cured to ensure the smoothness of the film surface hence significantly improving the productivity. Also, the heat-sensitive stencil sheet according to the present invention is provided satisfying the primary requirements: (1) the passing-through of printing ink, (2) case of the perforation, (3) no removal of fibers, (4) the resistance to printing action, and (5) the productivity.

What is claimed is:

1. A method of fabricating a heat-sensitive stencil sheet, said method comprising steps of:

bonding a tissue paper on one side of a porous resin layer provided on a thermoplastic resin film, by point-bonding with an ionizing radiation-curable resin; and irradiating the point-bonded tissue paper with an electron beam thereby perfecting bonding between the issue paper and said one side of the porous resin layer provided on the thermoplastic resin film.

2. A method of fabricating a heat-sensitive stencil sheet, said method comprising steps of:

applying an ionizing radiation-curable resin onto one side of a tissue paper; bonding the resin-applied side of the tissue paper to one side of a a porous resin layer provided on a thermoplastic resin film, by point-bonding with the ionizing radiation-curable resin; and irradiating the point-bonded tissue paper with an electron beam, thereby perfecting bonding between the tissue paper and said one side of the porous resin layer provided on the thermoplastic resin film.

3. The method of claim 1, further comprising the step of forming an anti-stick layer on the other side of the thermoplastic resin film.

4. The method of claim 1, further comprising the step of impregnating the tissue paper with ionizing radiation-curable resin prior to the point-bonding.

5. The method of claim 4, wherein the ionizing radiation-curable resin is impregnated into the tissue paper by size-press processing.

6. The method of claim 1, further comprising the step of separating a multi-layer paper to obtain the tissue paper.

7. The method of claim 6, wherein ionizing radiation-curable resin is impregnated into the multi-layer paper by size-press processing.

8. The method of claim 2, further comprising the step of forming an anti-stick layer on the other side of the thermoplastic resin film.

9. The method of claim 2, further comprising the step of impregnating the tissue paper with ionizing radiation-curable resin prior to the point-bonding.

10. The method of claim 9, wherein the ionizing radiation-curable resin is impregnated into the tissue paper by size-press processing.

11. The method of claim 2, further comprising the step of separating a multi-layer paper to obtain the tissue paper.

12. The method of claim 11, wherein ionizing radiation-curable resin is impregnated into the multi-layer paper by size-press processing.

* * * * *